US012041435B2

(12) United States Patent
Xiao et al.

(10) Patent No.: US 12,041,435 B2
(45) **Date of Patent: *Jul. 16, 2024**

(54) MULTIFUNCTIONAL SOUNDING DEVICE

(71) Applicant: AAC Microtech (Changzhou) Co., Ltd., Changzhou (CN)

(72) Inventors: Bo Xiao, Shenzhen (CN); Ronglin Linghu, Shenzhen (CN)

(73) Assignee: AAC MICROTECH (CHANGZHOU) CO., LTD., Changzhou (CN)

(*) Notice: Subject to any disclaimer, the term of this patent is extended or adjusted under 35 U.S.C. 154(b) by 169 days.

This patent is subject to a terminal disclaimer.

(21) Appl. No.: 17/863,359

(22) Filed: Jul. 12, 2022

(65) Prior Publication Data

US 2023/0100237 A1 Mar. 30, 2023

(30) Foreign Application Priority Data

Sep. 29, 2021 (CN) .......................... 202111147795.5

(51) Int. Cl.
*H04R 9/02* (2006.01)

(52) U.S. Cl.
CPC .................................... *H04R 9/025* (2013.01)

(58) Field of Classification Search
CPC .... H04R 2499/11; H04R 17/00; H04R 9/025; H04R 2400/03; H04R 9/02; G10K 2210/129
USPC ................................ 381/190, 412, 162, 326
See application file for complete search history.

(56) References Cited

U.S. PATENT DOCUMENTS

2010/0046783 A1* 2/2010 Huang ................ H04R 1/1075 381/380
2018/0184209 A1* 6/2018 Zhu .......................... H04R 9/06

* cited by examiner

*Primary Examiner* — Norman Yu
(74) *Attorney, Agent, or Firm* — W&G Law Group

(57) ABSTRACT

The invention provides a multifunctional sounding device having a housing body with a containment cavity and a sounding unit. The sounding unit includes a vibration system and a magnetic circuit system that drives the vibration system along a first direction. The magnetic circuit system includes a main magnet and a secondary magnet to form a magnetic gap. The multifunctional sounding device further includes an elastic assembly fixedly connected to the housing body, a weight connected to the elastic assembly, and a driving coil fixed to the weight and vibrating together with the weight along a second direction. The driving coil includes a first side edge and a second side edge disposed opposite to the first side edge. The device has both a vibration feedback function and a voice feedback function, which is beneficial to reduce the volume of the electronic device.

11 Claims, 12 Drawing Sheets

A-A

C

MULTIFUNCTIONAL SOUNDING DEVICE

FIELD OF THE PRESENT DISCLOSURE

The present invention relates to the technical field of electronic devices, in particular to a multifunctional sounding device.

DESCRIPTION OF RELATED ART

With the development of electronic technology, portable consumer electronic devices are more and more sought after by people, such as mobile phones, handheld game consoles, navigation devices or handheld multimedia entertainment devices, etc. These electronic devices generally provide system feedback through voice and/or vibration, such as incoming call prompts from mobile phones, navigation prompts, and vibration feedback from game consoles.

In the prior art, the vibration feedback and the voice feedback of the electronic device are completed by different devices respectively, but the development trend of the electronic device is to be short, light and thin, and the more devices, the less conducive to the reduction of the size of the electronic device.

SUMMARY OF THE PRESENT INVENTION

The purpose of the present invention is to provide a multifunctional sounding device, which has both a vibration feedback function and a voice feedback function, and which is beneficial to reduce the volume of the electronic device.

To achieve the object mentioned above, the present invention provides a multifunctional sounding device comprising:

a housing body with a containment cavity;

a sounding unit placed in the containment cavity, comprising a vibration system, a magnetic circuit system having a main magnet and a secondary magnet arranged around the main magnet to form a magnetic gap for driving the vibration system to vibrate and produce sound along a first direction;

an elastic assembly in the containment cavity and fixedly connected with the housing body;

a weight connected with the elastic assembly to be suspended in the containment cavity for being movable along a second direction which is perpendicular to the first direction;

a driving coil fixed to the weight, comprising a first side edge and a second side edge opposite to the first side edge; wherein in the first direction, the first side edge is spaced from the main magnet; the second side edge is spaced from the secondary magnet.

As an optional improvement, a polarity of one end of the main magnet toward the driving coil is opposite to a polarity of one end of the secondary magnet toward the driving coil.

As an optional improvement, the first side edge and the second side edge cooperatively form a wire winding hole, and in the first direction, the wire winding hole is located opposite to the magnetic gap.

As an optional improvement, the weight has a mounting groove for fixing the driving coil; the first side edge and the second side edge together form a wire winding hole; a groove bottom of the mounting groove protrudes and forms a positioning part for being aligned and assembled into the wire winding hole.

As an optional improvement, the magnetic circuit system further comprises a yoke fixedly connected with the main magnet and the secondary magnet; the yoke includes an avoidance space; the first side edge is spaced from the main magnet through the avoidance space; the second side edge is spaced from the secondary magnet by the avoidance space.

As an optional improvement, in the first direction, the yoke part is located inside the mounting groove.

As an optional improvement, the weight comprises a motherboard part formed with the mounting groove, and a side panel part formed by bending and extending in a direction toward the sounding unit from opposite two ends of the motherboard part disposed in the third direction; the third direction is perpendicular to the first direction and the second direction; an outer edge of the end face of the secondary magnet facing the driving coil is formed with an inverted angle opening; the side panel part comprises a first part located on the peripheral side of the sounding unit and a second part extending from the motherboard part and opening relative to the inverted angle to connect with the first part.

As an optional improvement, the multifunctional sounding device further comprises a frame; wherein the vibration system comprises a voice coil, an upper diaphragm and a dome inserted in the magnetic gap; the upper diaphragm comprises a first folded circular part, a first outer flipped edge extending from the outer edge of the first folded circular part, and a first inner flipped edge extending from the inner edge of the first folded circular part; the first outer flipped edge is fixed to the frame; the first inner flipped edge is fixed on the dome, and the dome is fixedly connected with the voice coil.

As an optional improvement, the multifunctional sounding device further comprising a frame; wherein the vibration system comprises a voice coil inserted in the magnetic gap, an upper diaphragm, a lower diaphragm located opposite to the upper diaphragm along the first direction, and a skeleton located between the upper diaphragm and the lower diaphragm.

The skeleton comprises a main body part, a first bended part bending and extending from the inner edge of the main body part, and a second bended part bending and extending from the outer edge of the main body part, and the voice coil is fixed to the first bended part; the upper diaphragm comprises a first folded circular part, a first outer flipped edge extending from the outer edge of the first folded circular part, and a first inner flipped edge extending from the inner edge of the first folded circular part.

The first outer flipped edge is fixed to the frame; the first inner flipped edge is fixed on the main body part of the skeleton; the lower diaphragm comprises a second folded circular part disposed opposite to the first folded circular part, a second outer flipped edge extending from the outer edge of the second folded circular part, and a second inner flipped edge extending from the inner edge of the second folded circular part; the second outer flipped edge is fixed to the end face of the frame away from the first outer flipped edge; the second inner flipped edge is fixed to the second bended part.

As an optional improvement, the upper diaphragm further comprises a third folded circular part disposed inside the first folded circular part, and a third outer flipped edge extending from the outer edge of the third folded circular part, and a third inner flipped edge extending from the inner edge of the third folded circular part; the sounding unit also comprises a positioning ring sleeved on the magnetic circuit system; and wherein, the third outer flipped edge is fixed on the main body part of the skeleton; the third inner flipped edge is fixed on the positioning ring.

As an optional improvement, the vibration system further comprises a dome set on the main body part, and the dome is located inside the first inner flipped edge.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
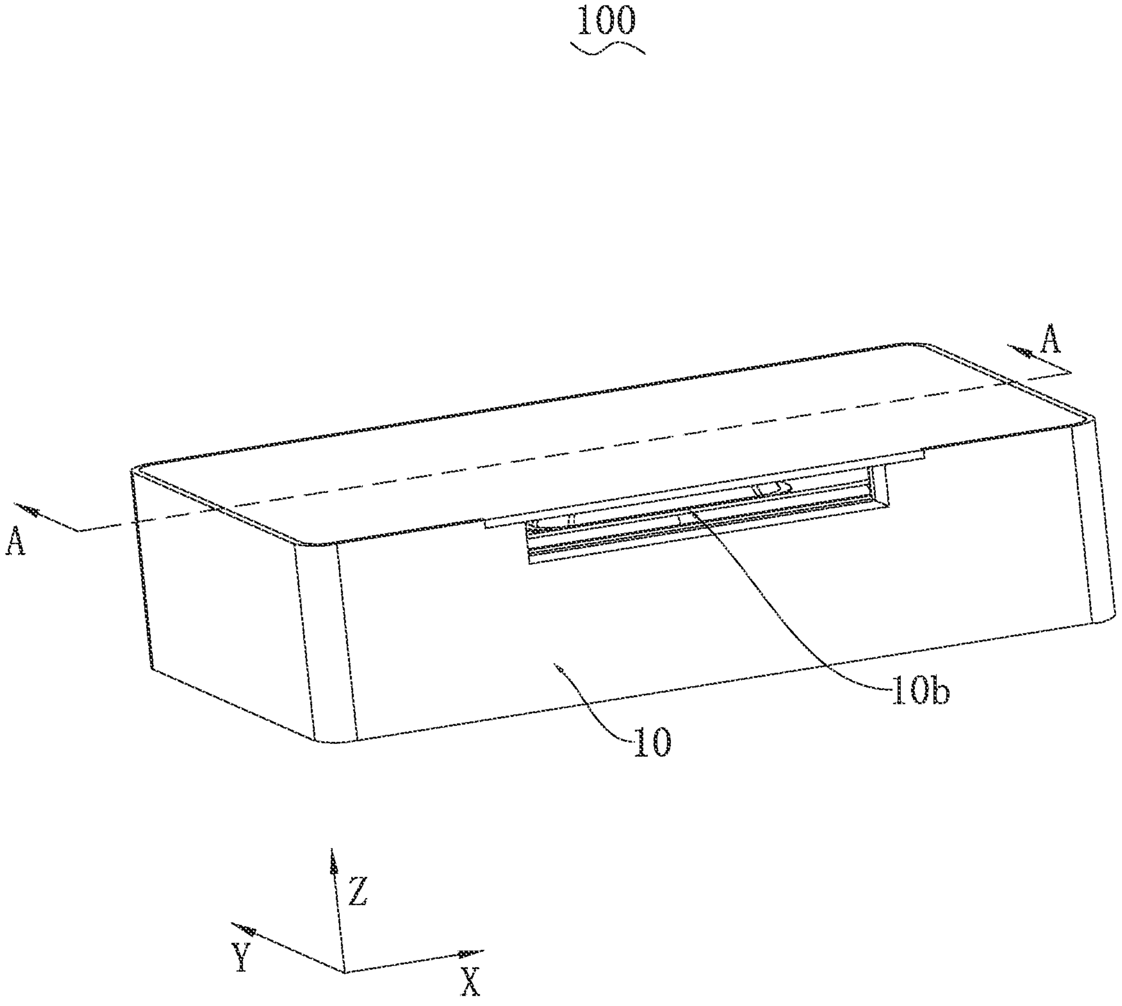
FIG. 1 is an isometric view of a multifunctional sounding device in accordance with an embodiment of the present invention.

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

It should be noted that the terminology used herein is for the purpose of describing specific embodiments only, and is not intended to limit the exemplary embodiments according to the present invention. As used herein, unless the context clearly dictates otherwise, the singular is intended to include the plural as well, furthermore, it is to be understood that when the terms "comprising" and/or "including" are used in this description, it indicates the presence of features, steps, operations, devices, components and/or combinations thereof.

The present invention will be further described below with reference to the accompanying drawings and embodiments. The present invention provides a multifunctional sounding device 100, which can be used in electronic equipment, and can play a feedback prompting function by sounding, and can also play a feedback prompting role by vibrating. Referring to FIGS. 1-12, the multifunctional sounding device 100 comprises a housing body 10 having a containment cavity 10*a* and a sounding unit 20 contained within the containment cavity 10*a* and separating the containment cavity 10*a* to a front cavity and a rear cavity. The housing body 10 is provided with a sound output hole 10*b* which is connected with the front cavity, so as to realize sound output. The rear cavity can be filled with sound absorbing powder to improve the low frequency acoustic performance of the device.

Wherein, the sounding unit 20 comprises a vibration system 21 and a magnetic circuit system 22 that drives the vibration system 21 to vibrate and sound in the first direction. The magnetic circuit system 22 comprises a main magnet 221 and a secondary magnet 222 disposed around the main magnet 221 to form a magnetic gap 22*a*. The vibration system 21 comprises a voice coil 211 inserted in the magnetic gap 22*a*. The voice coil 211 vibrates under the action of the main magnet 221 and the secondary magnet 222 to realize the vibration of the entire vibration system 21, so as to realize the voice feedback prompt of the device.

Figure 2:
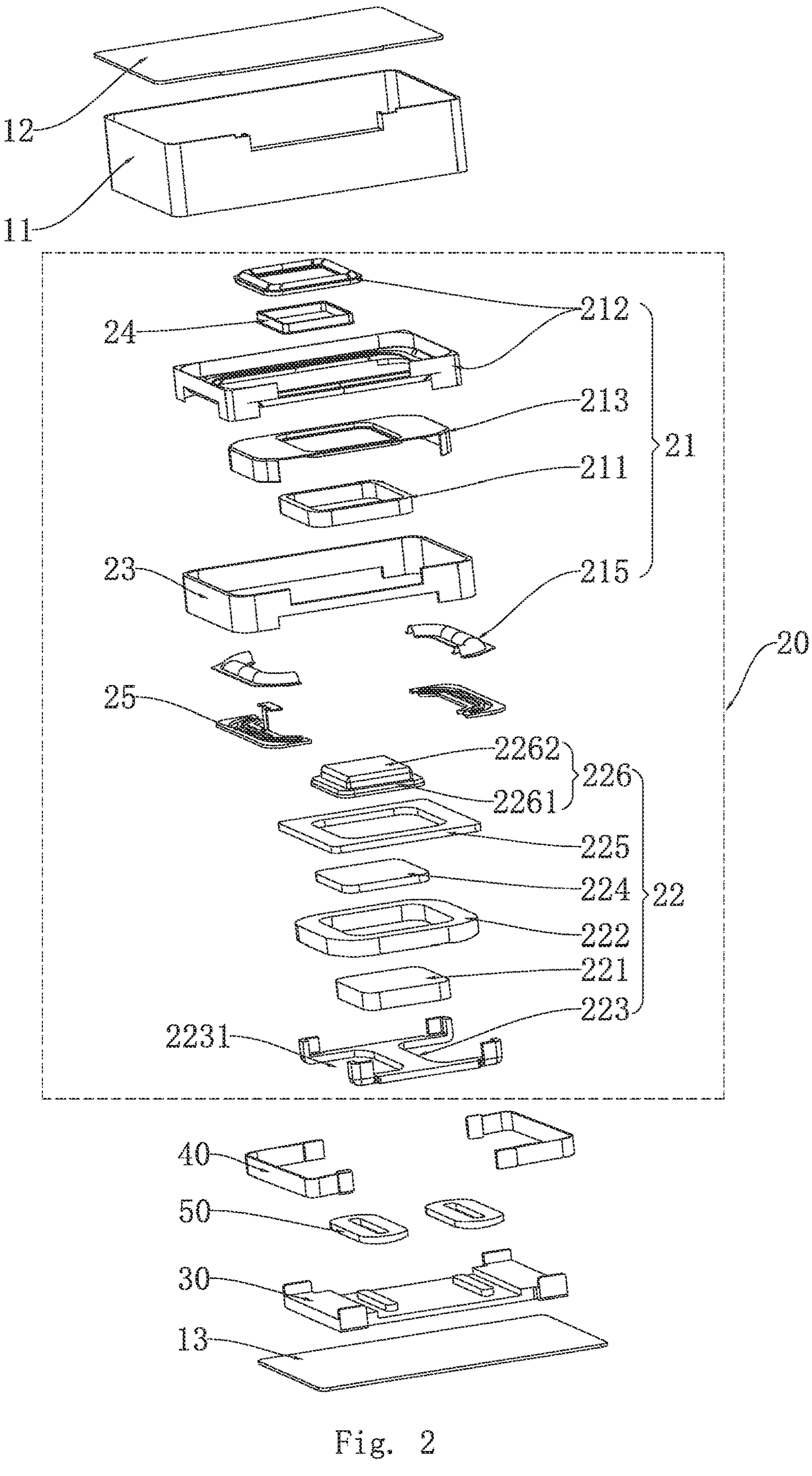
FIG. 2 is an exploded view of the multifunctional sounding device in FIG. 1.
Figure 6:
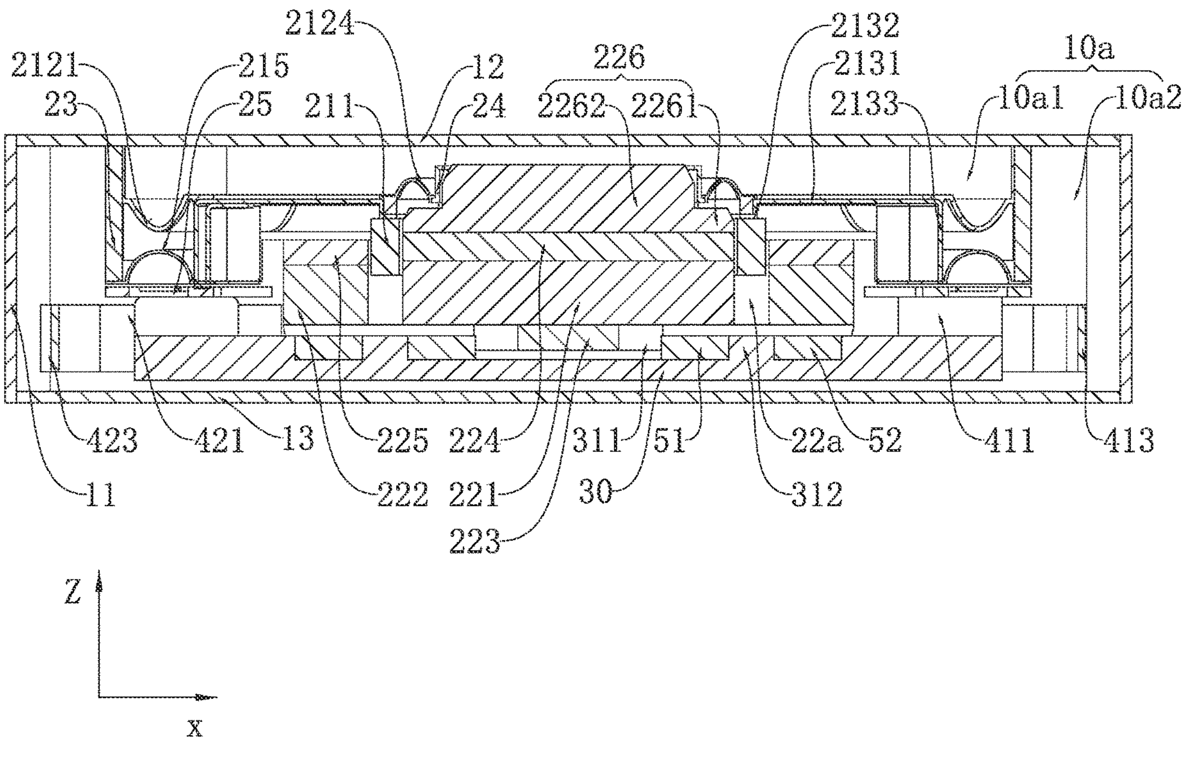
FIG. 6 is a cross-sectional view of the multifunctional sounding device taken along line AA in FIG. 1.

Referring to FIG. 2 and FIG. 6, the housing body 10 comprises a frame body 11, an upper cover 12 covering one end of the frame body 11, and a bottom plate 13 covering the other end of the frame body 11. The frame body 11, the upper cover 12 and the bottom plate 13 together form a containment cavity 10*a*.

Referring to FIGS. 2-4 and 6, in order to realize the vibration feedback function of the device, the device also comprises an elastic assembly 40, a weight 30 and a driving coil 50. The elastic assembly 40 is placed in the containment cavity 10*a* and fixedly connected to the housing body 10. The weight 30 is connected to the elastic assembly 40 to be suspended within the containment cavity 10*a*. The driving coil 50 is fixed to the weight 30 and vibrates together with the weight 30 in the second direction. The driving coil 50 comprises a first side edge 51 and a second side edge 52 provided opposite to the first side edge 51. And in the first direction, the first side edge 51 and the main magnet 221 are set opposite to each other with a space. The second side edge 52 is set opposite to the secondary magnet 222 with a space.

wherein, as shown in FIG. 1, FIG. 3, and FIGS. 6-8, the Z direction is the first direction. The X direction is the second direction. The Y direction is the third direction. The first direction is the vibration direction of the vibration system 21. The second direction is the vibration direction of weight 30. The second direction is perpendicular to the first direction. The third direction is perpendicular to the first direction and the second direction.

In the present invention, the weight 30 is suspended in the containment cavity 10*a* by the elastic assembly 40, and then the driving coil 50 is fixed on the weight 30. The first side edge 51 of the driving coil 50 is disposed opposite to the main magnet 221 with a space along the first direction (vibration direction of the vibration system 21). The second side edge 52 of the driving coil 50 is set opposite to the secondary magnet 222 with a space along the first direction. Therefore, the weight 30 can vibrate along the second direction perpendicular to the first direction together with the driving coil 50 under the interaction of the main magnet 221, the secondary magnet 222 and the driving coil 50. That is to say, the whole driving coil 50 and the weight 30 are used as a vibrator, and the sounding unit 20 with the main magnet 221 and the secondary magnet 222 is used as a stator. The interaction force between the driving coil 50 and the main magnet 221 and the secondary magnet 222 makes the driving coil 50 vibrate together with the weight 30 to realize the vibration feedback of the device. The device in the technical solution has both a vibration feedback function and a voice feedback function, which is beneficial to reducing the volume of the electronic device.

It should be noted that the polarity of the end of the main magnet 221 toward the driving coil 50 is opposite to the polarity of the end of the secondary magnet 222 toward the driving coil 50, so that the driving coil 50 can vibrate.

Figure 3:
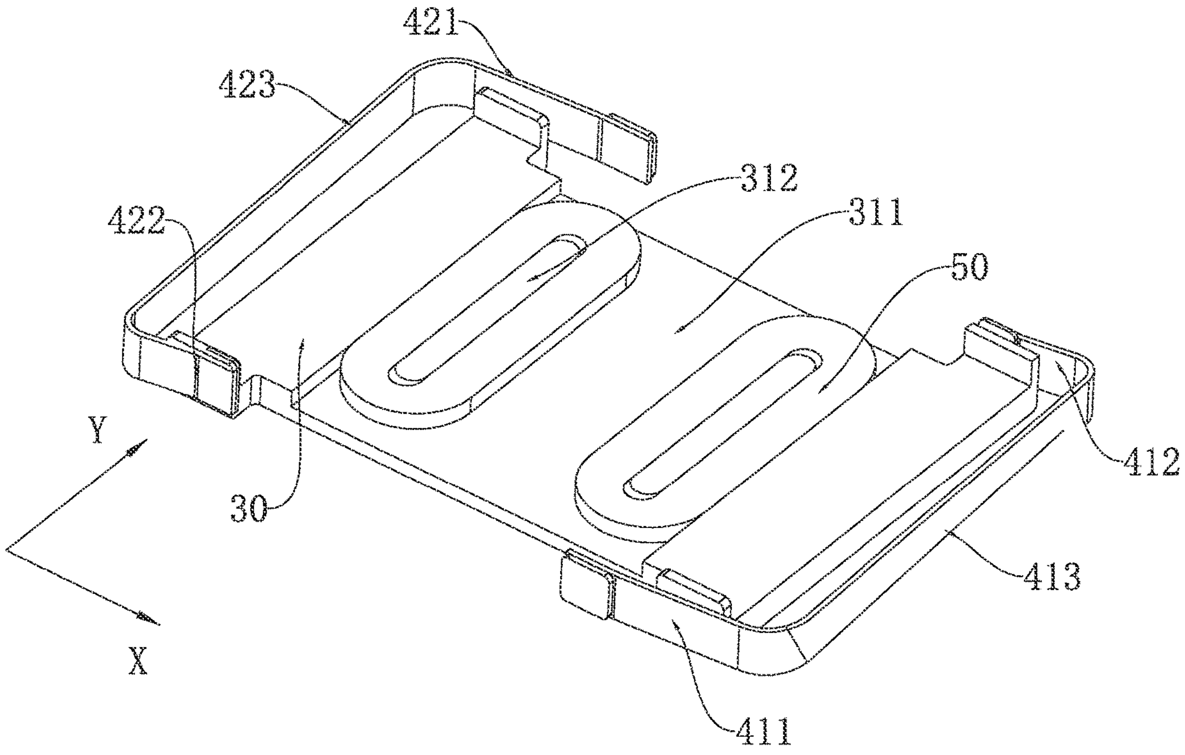
FIG. 3 is an isometric view of a part of the multifunctional sounding device of the present invention.

In some specific embodiments, referring to FIG. 6, the first side edge 51 and the second side edge 52 together enclose a wire winding hole 50*a*, and in the first direction, the wire winding hole 50*a* is disposed opposite to the magnetic gap 22*a*. The relative positions between the driving coil 50 and the main magnet 221 and the secondary magnet 222 are optimized. The relative interactive force between the driving coil 50 and the main magnet 221 and the secondary magnet 222 is increased, which ensures the driving of the sounding unit 20.

wherein, the number of the driving coils 50 may be one or more. As shown in FIG. 3 and FIG. 6, two driving coils 50 are arranged. The two driving coils 50 are arranged and fixed on the weight 30 along the second direction. The relative area between the driving coil 50 and the main magnet 221 and the relative area between the driving coil 50 and the secondary magnet 222 can be increased by increasing the number of the driving coils 50 in a limited space. Therefore, the interaction force between the driving coil 50 and the main magnet 221, the secondary magnet 222 increases.

Figure 4:
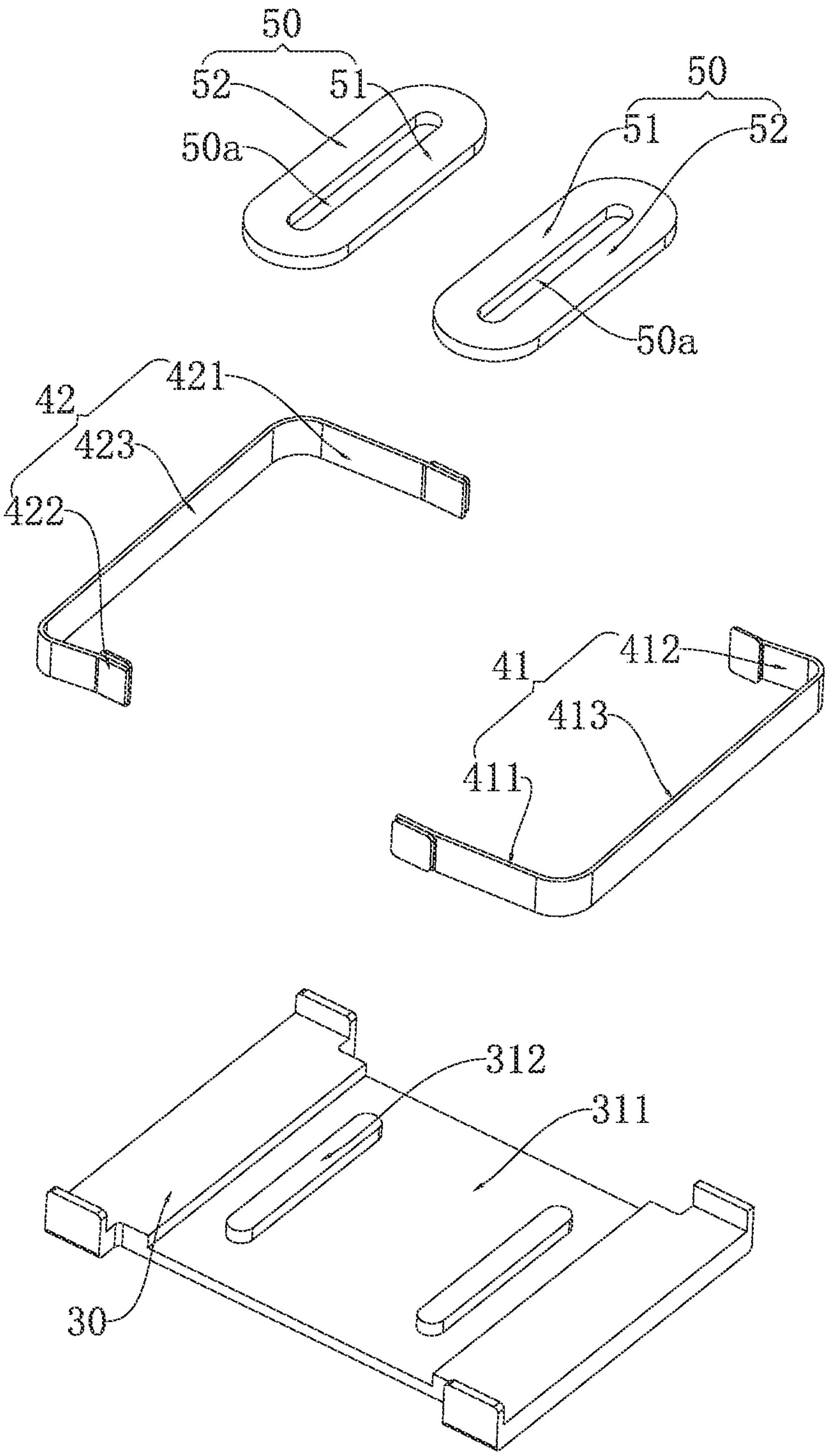
FIG. 4 is an exploded view of FIG. 3.
Figure 5:
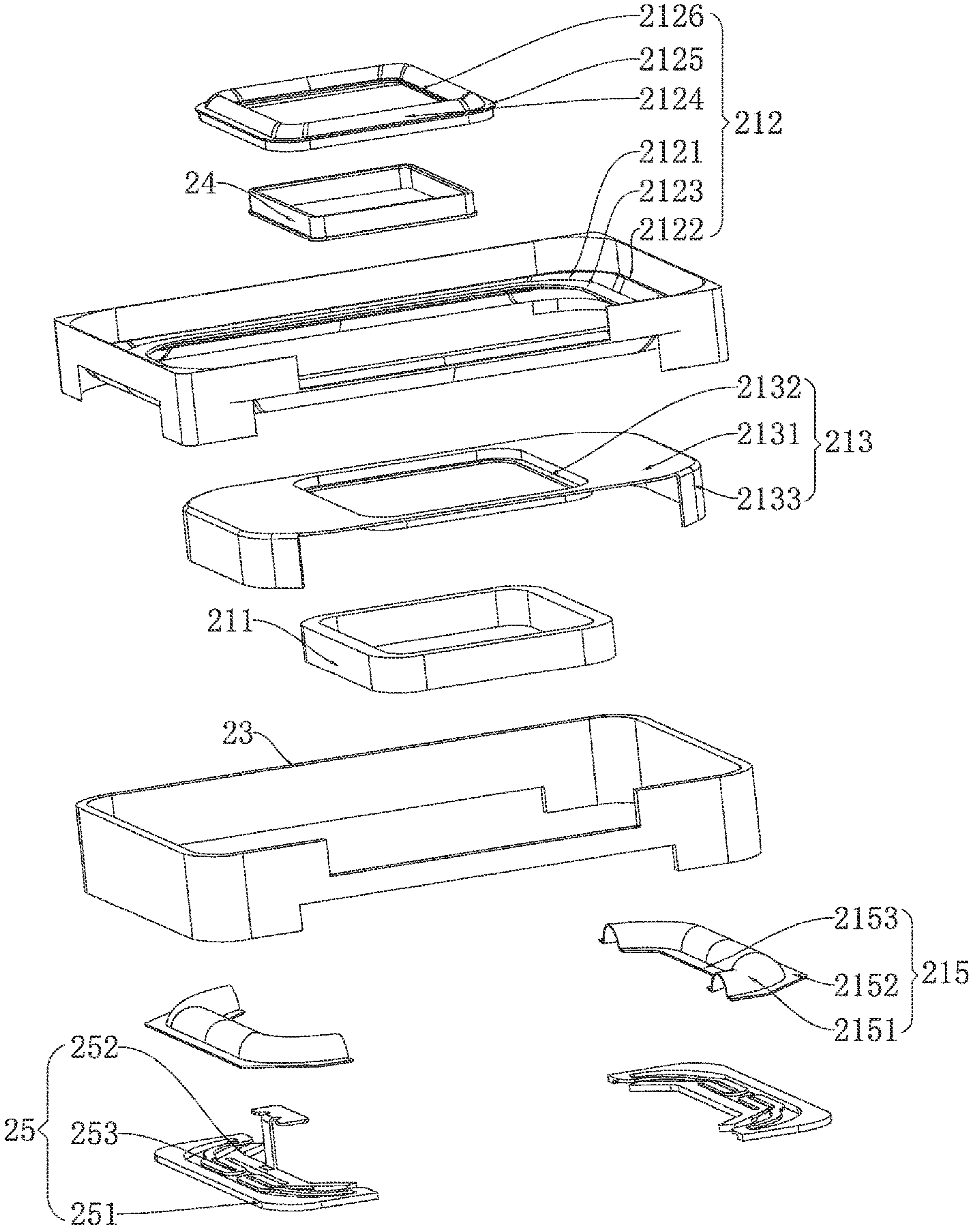
FIG. 5 is an exploded view of the multifunctional sounding device.

In one embodiment, referring to FIGS. 2-4, the elastic assembly 40 comprises a first elastic member 41 and a second elastic member 42. The first elastic member 41 comprises a first elastic arm 411 for connecting with the housing body 10, a second elastic arm 412 for connecting with the weight 30, and a first connection arm 413 connected between the first elastic arm 411 and the second elastic arm 412. The second elastic member 42 comprises a third elastic arm 421 for connecting with the housing body 10, a fourth elastic arm 422 for connecting with the weight 30, and a second connection arm 423 connected between the third elastic arm 421 and the fourth elastic arm 422.

In some specific embodiments, the first elastic arm 411 and the third elastic arm 421 are disposed on both sides of the weight 30 along the third direction. The second elastic arm 412 and the fourth elastic arm 422 are located on both sides of the weight 30 along the third direction. The first connection arm 413 and the second connection arm 423 are located at both ends of the weight 30 along the second direction. Thus, the stable support of the weight 30 by the elastic assembly 40 is realized.

In some specific embodiments, the first elastic arm 411 can be connected with the housing body 10 through a sticking member with stickiness. The second elastic arm 412 can be connected to the weight 30 through the sticking member with stickiness.

The third elastic arm 421 can be connected to the housing body 10 through the sticking member with stickiness. The fourth elastic arm 422 can be connected with the weight 30 through the sticking member with stickiness.

Figure 10:
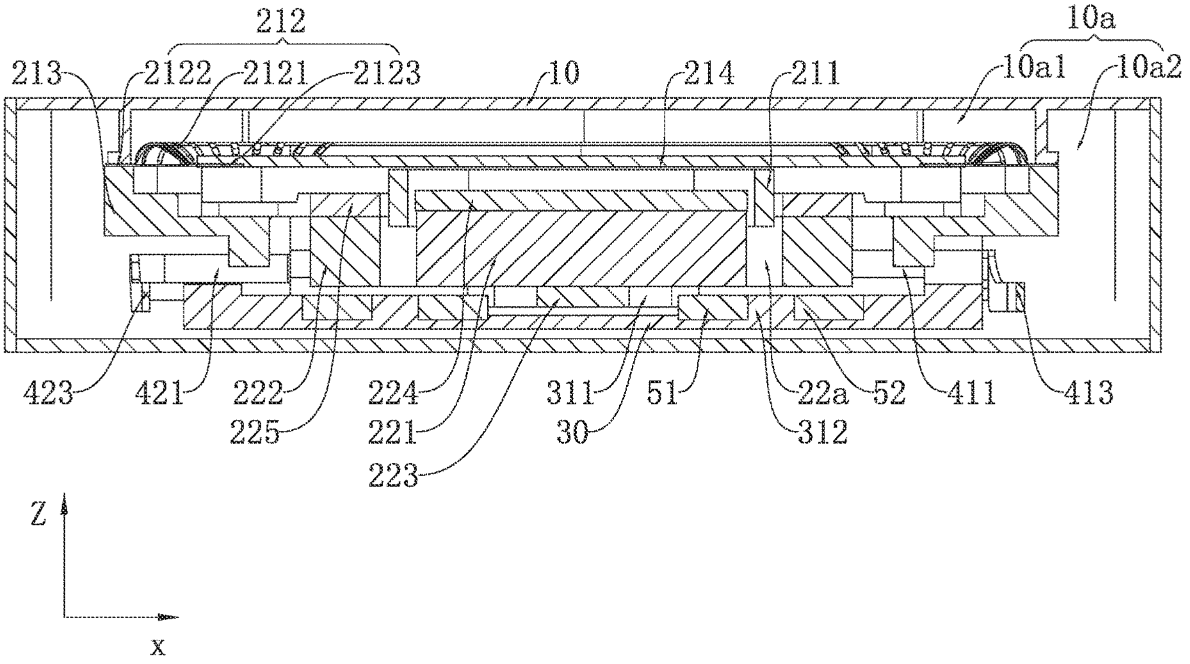
FIG. 10 is a cross-sectional view of a multifunctional sounding device provided by another embodiment of the present invention.

The following is an example of the structure of the sounding unit 20:

In one embodiment, referring to FIG. 10, the vibration system 21 also comprises an upper diaphragm 212 and a dome 214. The upper diaphragm 212 comprises a first folded circular part 2121, a first outer flipped edge 2122 extending from the outer edge of the first folded circular part 2121, and a first inner flipped edge 2123 extending from the inner edge of the first folded circular part 2121. The sounding unit 20 also comprises a frame 23, wherein, the first outer flipped edge 2122 is fixed on the frame 23. The first inner flipped edge 2123 is fixed to the dome 214. And the dome 214 is fixedly connected with the voice coil 211, so that the voice coil 211 drives the upper diaphragm 212 to vibrate.

Figure 9:
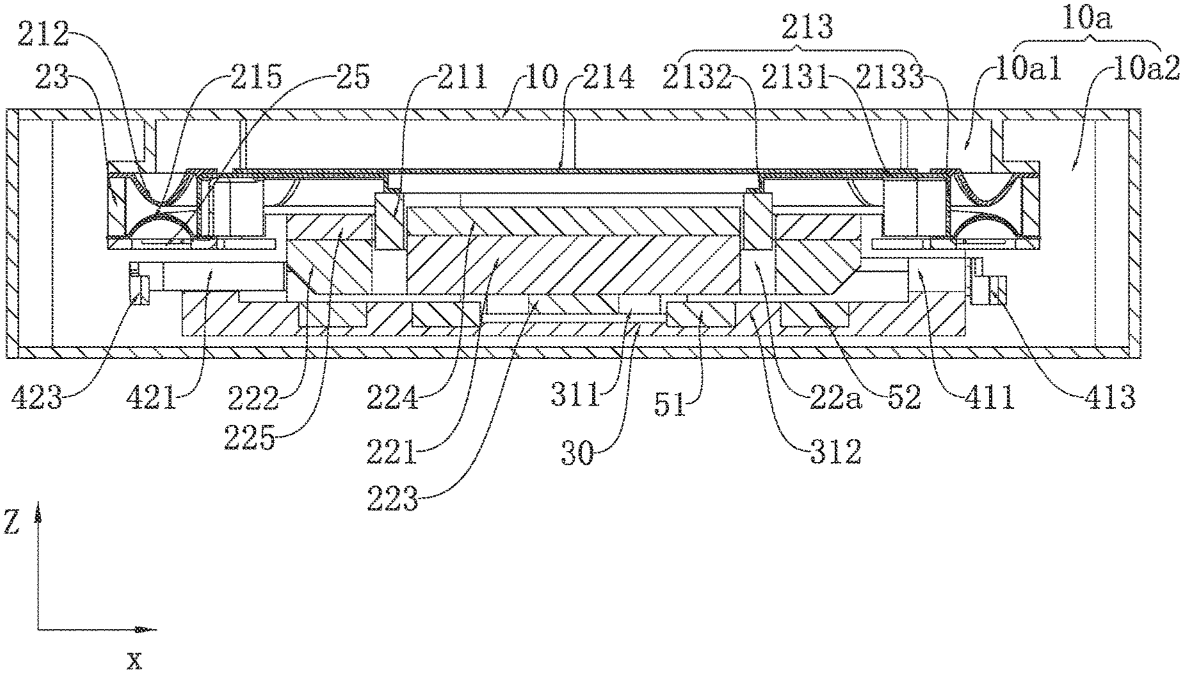
FIG. 9 is a cross-sectional view of a multifunctional sounding device provided by another embodiment of the present invention.

In another embodiment, referring to FIG. 9, the sounding unit 20 further comprises a frame 23. The system 21 also comprises an upper diaphragm 212, a lower diaphragm vibration 215 arranged opposite to the upper diaphragm 212 in the first direction, and a skeleton 213 arranged between the upper diaphragm 212 and the lower diaphragm 215. The skeleton 213 comprises a main body part 2131, a first bended part 2132 bending and extending from the inner edge of the main body part 2131, and a second bended part 2133 bending and extending from the outer edge of the main body part 2131. The voice coil 211 is fixed to the first bended part 2132.

The upper diaphragm 212 comprises a first folded circular part 2121, a first outer flipped edge 2122 extending from the outer edge of the first folded circular part 2121, and a first inner flipped edge 2123 extending from the inner edge of the first folded circular part 2121. The first outer flipped edge 2122 is fixed on the frame 23. The first inner flipped edge 2123 is fixed on the main body part 2131 of the skeleton 213. The lower diaphragm 215 comprises a second folded circular part 2151 disposed opposite to the first folded circular part 2121, a second outer flipped edge 2152 extending from the outer edge of the second folded circular part 2151, and a second inner flipped edge 2153 extending from the inner edge of the second folded circular part 2151. The second outer flipped edge 2152 is fixed on the end surface of the frame 23 away from the first outer flipped edge 2122. The second inner flipped edge 2153 is fixed to the second bended part 2133.

In addition, the vibration system 21 also comprises a dome 214 on the main body part 2131 of the skeleton 213, and the dome 214 is located inside the first inner flipped edge 2123. The strength of the skeleton 213 can be strengthened by the dome 214, the torsion resistance and the anti-sway ability of the skeleton 213 are improved, and the acoustic performance of the sounding unit 20 is improved.

Referring to FIG. 9, two of the lower diaphragms 215 are arranged. The two of the lower diaphragms 215 are arranged in the second direction so as to be opposed to both ends of the upper diaphragm 212. The second folded circular part 2151 is formed by the lower diaphragm 215 protruding towards the first folded circular part 2121. The space on the side of the second folded circular part 2151 away from the first folded circular part 2121 is saved. Furthermore, the first connection arm 413 may be located on a side of one of the second folded circular parts 2151 away from the first folded circular part 2121, and the second connection arm 423 may be located at a side of the other second folded circular part 2151 away from the first folded circular part 2121.

In this way, the first connection arm 413 and the second connection arm 423 are moved away from the inner wall of the housing body 10. The distance between the first connection arm 413 and the housing body 10 and the distance between the second connection arm 423 and the housing body 10 increase. As a result, the space of the rear cavity is increased, which can be used to fill the sound absorbing powder and improve the acoustic performance of the device.

Wherein, the sounding unit 20 further comprises a flexible circuit board 25 for electrical connection with the voice coil 211. The flexible circuit board 25 comprises a first fixed arm 251 fixed to the second outer flipped edge 2152, a second fixed arm 252 fixed to the second inner flipped edge 2153, a spring arm 253 connected between the first fixed arm 251 and the second fixed arm 252.

Figure 7:
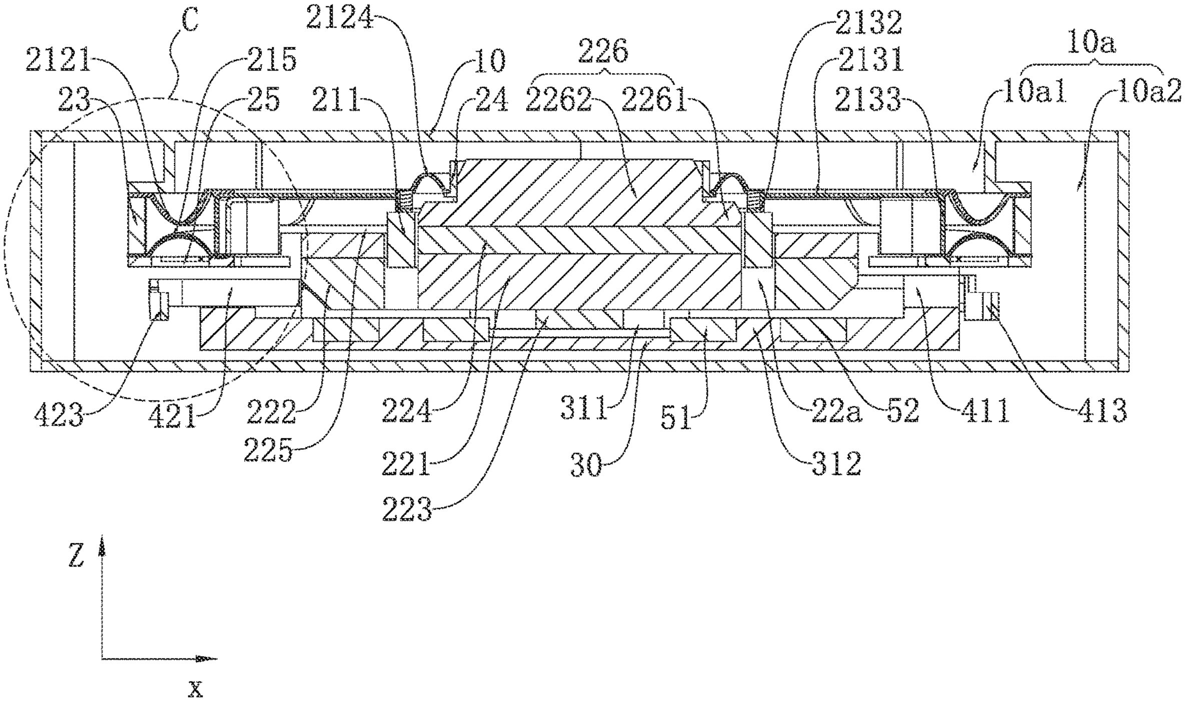
FIG. 7 is a cross-sectional view of a multifunctional sounding device in accordance with another embodiment of the present invention.

In another embodiment, referring to FIG. 7, the sounding unit 20 further comprises a frame 23. The system 21 also comprises an upper diaphragm 212, a lower diaphragm vibration 215 arranged opposite to the upper diaphragm 212 in the first direction, and a skeleton 213 arranged between the upper diaphragm 212 and the lower diaphragm 215. The skeleton 213 comprises a main body part 2131, a first bended part 2132 bending and extending from the inner edge of the main body part 2131, and a second bended part 2133 bending and extending from the outer edge of the main body part 2131. The voice coil 211 is fixed to the first bended part 2132. The upper diaphragm 212 comprises a first folded circular part 2121, a first outer flipped edge 2122 extending from the outer edge of the first folded circular part 2121, and a first inner flipped edge 2123 extending from the inner edge of the first folded circular part 2121. The first outer flipped edge 2122 is fixed on the frame 23. The first inner flipped edge 2123 is fixed on the main body part 2131 of the skeleton 213. The lower diaphragm 215 comprises a second folded circular part 2151 disposed opposite to the first folded circular part 2121, a second outer flipped edge 2152 extending from the outer edge of the second folded circular part 2151, and a second inner flipped edge 2153 extending from the inner edge of the second folded circular part 2151.

The second outer flipped edge 2152 is fixed on the end surface of the frame 23 away from the first outer flipped edge 2122. The second inner flipped edge 2153 is fixed to the second bended part 2133. The upper diaphragm 212 further comprises a third folded circular part 2124 disposed inside the first folded circular part 2121, a third outer flipped edge 2125 formed by extending from the outer edge of the third folded circular part 2124, and a third inner flipped edge 2126 formed by extending from the inner edge of the third folded circular part 2124. The sounding unit 20 further comprises a positioning ring 24 sleeved on the magnetic circuit system 22. Wherein, the third outer flipped edge 2125 is fixed on the main body part 2131 of the skeleton 213. The third inner flipped edge 2126 is fixed on the positioning ring 24.

Figure 11:
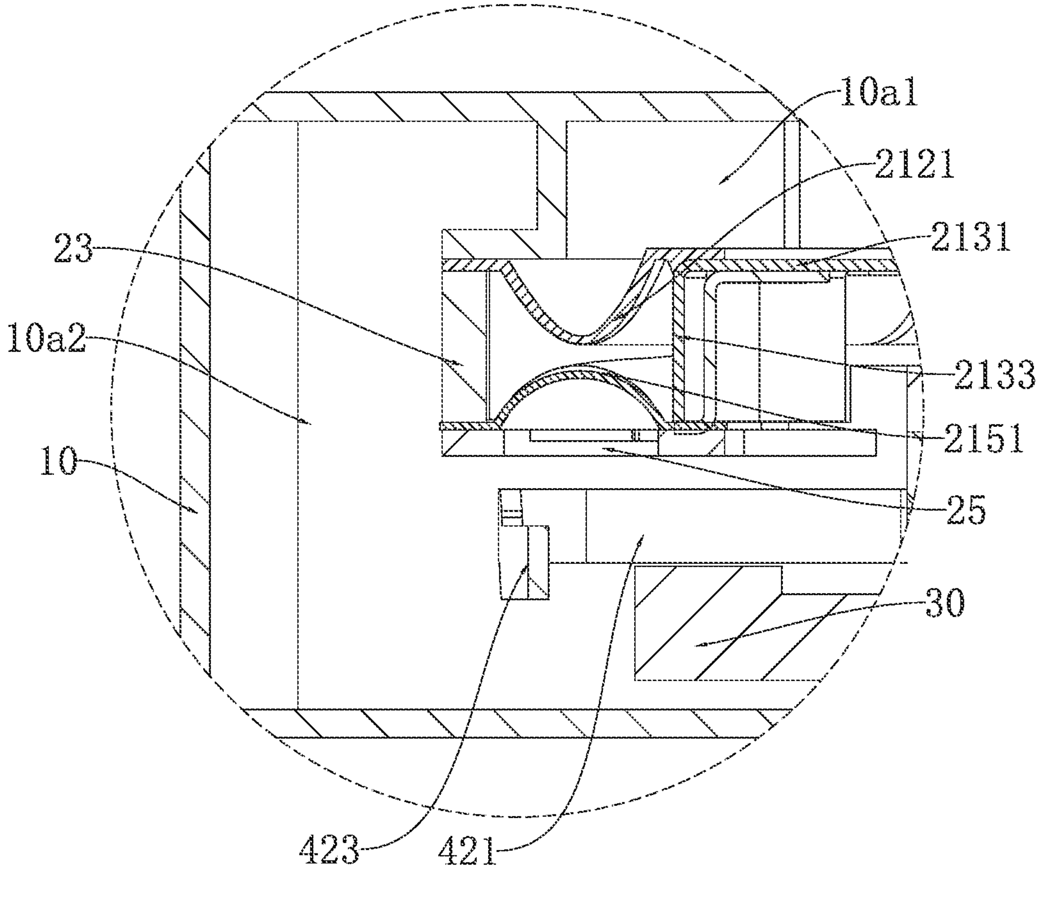
FIG. 11 is an enlarged view of part C in FIG. 7.

Referring to FIGS. 7 and 11, two of the lower diaphragms 215 are arranged. The two of the lower diaphragms 215 are arranged in the second direction so as to be opposed to both ends of the upper diaphragm 212. The second folded circular part 2151 is formed by the lower diaphragm 215 protruding towards the first folded circular part 2121. The space on the side of the second folded circular part 2151 away from the first folded circular part 2121 is saved. Furthermore, the first connection arm 413 is located on the side of one of the second folded circular parts 2151 away from the first folded circular part 2121.

The second connection arm 423 may be located on the side of the other second folded circular part 2151 away from the first folded circular part 2121. In this way, the first connection arm 413 and the second connection arm 423 can move away from the inner wall of the housing body 10, thereby increasing the distance between the first connection arm 413 and the housing body 10 and the distance between the second connection arm 423 and the housing body 10, Thereby the space of the rear cavity is increased, the space can be used to fill the sound absorbing powder and improve the acoustic performance of the device.

The sounding unit 20 also comprises a flexible circuit board 25 for electrical connection with the voice coil 211. The flexible circuit board 25 comprises a first fixed arm 251 fixed to the second outer flipped edge 2152, a second fixed arm 252 fixed to the second inner flipped edge 2153, and a spring arm 253 connected between the first fixed arm 251 and the second fixed arm 252.

In one embodiment, referring to FIGS. 3 and 4, the weight 30 is formed with a mounting groove 311. The driving coil 50 is fixed in the mounting groove 311. The mounting groove 311 realizes the mounting of the driving coil 50 relative to the weight 30 on the one hand, and partially overlaps the thickness of the driving coil 50 with the thickness of the weight 30 on the other hand. Therefore, the thickness of the device can be reduced, which is beneficial to the development of thinning.

Further, the groove bottom of the mounting groove 311 protrudes and forms a positioning part 312 for aligned and assembled into the wire winding hole 50*a*. The positioning part 312 is used to realize the quick positioning and installation of the driving coil 50.

Figure 8:
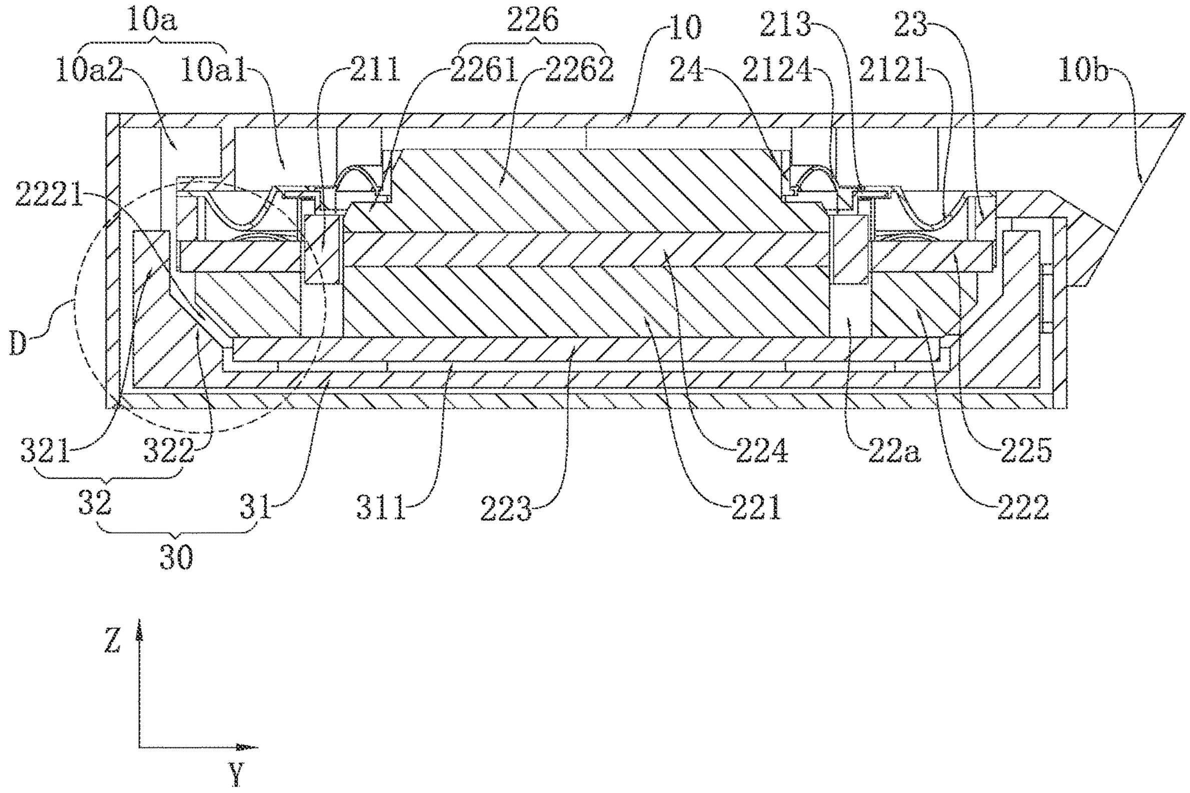
FIG. 8 is a cross-sectional view of a multifunctional sounding device provided by another embodiment of the present invention.
Figure 12:
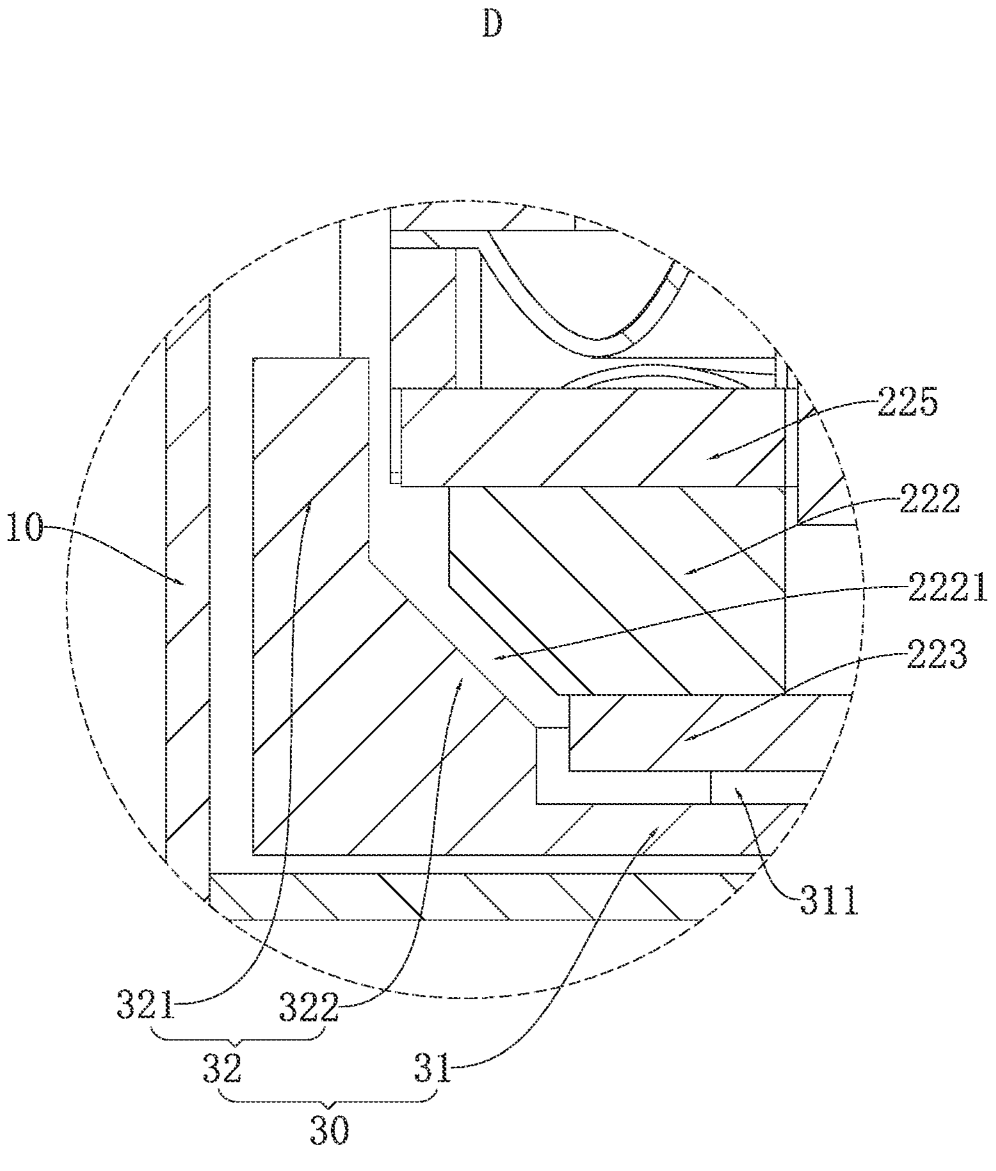
FIG. 12 is an enlarged view of part D in FIG. 8.

Referring to FIGS. 8 and 12, the weight 30 comprises a motherboard part 31 for forming a mounting groove 311, and a side panel part 32 formed by bending and extending in a direction toward the sounding unit 20 from two opposite ends of the motherboard part 31 in the third direction. Since the weight 30 vibrates in the second direction, the space formed by the weight 30 and the housing body 10 in the second direction is used for vibration. In order to increase the weight of the weight 30 to improve the effect of device vibration, the weight 30 not only comprises the motherboard part 31 for fixing the driving coil 50, but also comprises two side panel parts 32.

The two side panel parts 32 are formed by bending and extending both ends of the motherboard part 31 along the third direction, and the side panel parts 32 are extended in the direction toward the sounding unit 20. That is, the side panel part 32 is accommodated by the space formed by the weight 30 and the housing body 10 in the third direction, and the space formed by the sounding unit 20 and the housing body 10 in the third direction. Thereby an increase in the weight of the weight 30 can be achieved. On the other hand, the assembly of the weight 30 relative to the sounding unit 20 can be guided by the two side panel parts 32, thereby improving the assembly speed and quality.

In some specific embodiments, referring to FIGS. 8 and 12, an inverted angle opening 2221 is formed at the outer edge of the end face of the secondary magnet 222 facing the driving coil 50. The side panel part 32 comprises a first part 321 located on the peripheral side of the sounding unit 20 and a second part 322 extending from the motherboard part 31 and opposite to the inverted angle opening 2221 to connect with the first part 321. An inverted angle opening 2221 is provided on the secondary magnet 222, and the second part 322 is set opposite to the inverted angle opening 2221 to increase the thickness of the second part 322. On the one hand, it strengthens the connection between first part 321 and motherboard part 31, and on the other hand increases the weight of weight 30.

wherein, the magnetic circuit system 22 further comprises a yoke 223 for fixedly connecting the main magnet 221 and the secondary magnet 222. The avoidance space 2231 is formed on the yoke 223. The first side edge 51 is set opposite to the main magnet 221 with a space through the avoidance space 2231. The second side edge 52 is set opposite to the secondary magnet 222 with a space through the avoidance space 2231.

In some specific embodiments, referring to FIGS. 6-10, in the first direction, the yoke 223 is partially located within the mounting groove 311. While ensuring that the yoke 223 avoids the driving coil 50, the yoke 223 is partially accommodated in the mounting groove 311 of the weight 30. Therefore, the driving coil 50 is also partially located in the avoidance space 2231 of the yoke 223. By partially overlapping the thicknesses of the weight 30, the driving coil 50 and the yoke 223, the increase in the thickness of the device by the driving coil 50 and the weight 30 can be further reduced. That is, it is beneficial to reduce the thickness of the device.

Furthermore, the yoke 223 is located between two of the driving coils 50, and the middle part of the yoke 223 is fixedly connected to the main magnet 221. Both ends of the yoke 223 are fixedly connected to the secondary magnet 222 respectively.

Referring to FIGS. 6-10, the magnetic circuit system 22 further comprises a main pole core 224 attached to the first main magnet 221 and a secondary pole core 225 surrounding the main pole core 224 and attached to the secondary magnet 222.

In addition, referring to FIGS. 6-8, the magnetic circuit system 22 further comprises an upper magnet 226 attached to the side of the main pole core 224 away from the main magnet 221. The positioning ring 24 is arranged around and abuts the upper magnet 226.

In some specific embodiments, the upper magnet 226 comprises a base part 2261 abutting on the main pole core 224 and a top part 2262 protruding from the middle of the base part 2261 in a direction away from the main pole core 224. The positioning ring 24 surrounds the top part 2262 and abuts on the top part 2262. Thus, a stable setting of the positioning ring 24 is achieved.

It should be noted that the terms "first", "second" and the like in the description and claims of the present invention and the above drawings are used to distinguish similar objects, and are not necessarily used to describe a specific sequence or sequence. It is to be understood that the data so used may be interchanged under appropriate circumstances such that the embodiments of the invention described herein can, for example, be practiced in sequences other than those illustrated or described herein. Furthermore, the terms "comprising" and "having", and any variations thereof, are intended to cover non-exclusive inclusion. For example, a process, method, system, product or device comprising a series of steps or units is not necessarily limited to those steps or units expressly listed. Rather, other steps or units not expressly listed or inherent to the process, method, product or apparatus may be included.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device comprising:

a housing body with a containment cavity;

a sounding unit placed in the containment cavity, comprising a vibration system, a magnetic circuit system having a main magnet and a secondary magnet arranged around the main magnet to form a magnetic gap for driving the vibration system to vibrate and produce sound along a first direction;

an elastic assembly in the containment cavity and fixedly connected with the housing body;

a weight connected with the elastic assembly to be suspended in the containment cavity for being movable along a second direction which is perpendicular to the first direction;

a driving coil fixed to the weight, comprising a first side edge and a second side edge opposite to the first side edge; wherein in the first direction, the first side edge is spaced from the main magnet; the second side edge is spaced from the secondary magnet.

2. The multifunctional sounding device as described in claim 1, wherein, a polarity of one end of the main magnet toward the driving coil is opposite to a polarity of one end of the secondary magnet toward the driving coil.

3. The multifunctional sounding device as described in claim 1, wherein, the first side edge and the second side edge cooperatively form a wire winding hole, and in the first direction, the wire winding hole is located opposite to the magnetic gap.

4. The multifunctional sounding device as described in claim 1, wherein, the weight has a mounting groove for fixing the driving coil; the first side edge and the second side edge together form a wire winding hole; a groove bottom of the mounting groove protrudes and forms a positioning part for being aligned and assembled into the wire winding hole.

5. The multifunctional sounding device as described in claim 4, wherein, the magnetic circuit system further comprises a yoke fixedly connected with the main magnet and the secondary magnet; the yoke includes an avoidance space; the first side edge is spaced from the main magnet through the avoidance space; the second side edge is spaced from the secondary magnet by the avoidance space.

6. The multifunctional sounding device as described in claim 5, wherein, in the first direction, the yoke part is located inside the mounting groove.

7. The multifunctional sounding device as described in claim 4, wherein, the weight comprises a motherboard part formed with the mounting groove, and a side panel part formed by bending and extending in a direction toward the sounding unit from opposite two ends of the motherboard part disposed in the third direction; the third direction is perpendicular to the first direction and the second direction; an outer edge of the end face of the secondary magnet facing the driving coil is formed with an inverted angle opening; the side panel part comprises a first part located on the peripheral side of the sounding unit and a second part extending from the motherboard part and opening relative to the inverted angle to connect with the first part.

8. The multifunctional sounding device as described in claim 1 further comprising a frame; wherein the vibration system comprises a voice coil, an upper diaphragm and a dome inserted in the magnetic gap; the upper diaphragm comprises a first folded circular part, a first outer flipped edge extending from the outer edge of the first folded circular part, and a first inner flipped edge extending from the inner edge of the first folded circular part; the first outer flipped edge is fixed to the frame; the first inner flipped edge is fixed on the dome, and the dome is fixedly connected with the voice coil.

9. The multifunctional sounding device as described in claim 1 further comprising a frame; wherein the vibration system comprises a voice coil inserted in the magnetic gap, an upper diaphragm, a lower diaphragm located opposite to the upper diaphragm along the first direction, and a skeleton located between the upper diaphragm and the lower diaphragm;

the skeleton comprises a main body part, a first bended part bending and extending from the inner edge of the main body part, and a second bended part bending and extending from the outer edge of the main body part, and the voice coil is fixed to the first bended part; the upper diaphragm comprises a first folded circular part, a first outer flipped edge extending from the outer edge of the first folded circular part, and a first inner flipped edge extending from the inner edge of the first folded circular part;

the first outer flipped edge is fixed to the frame; the first inner flipped edge is fixed on the main body part of the skeleton; the lower diaphragm comprises a second folded circular part disposed opposite to the first folded circular part, a second outer flipped edge extending from the outer edge of the second folded circular part, and a second inner flipped edge extending from the inner edge of the second folded circular part; the second outer flipped edge is fixed to the end face of the frame away from the first outer flipped edge; the second inner flipped edge is fixed to the second bended part.

10. The multifunctional sounding device as described in claim 9, wherein, the upper diaphragm further comprises a third folded circular part disposed inside the first folded circular part, and a third outer flipped edge extending from the outer edge of the third folded circular part, and a third inner flipped edge extending from the inner edge of the third folded circular part; the sounding unit also comprises a positioning ring sleeved on the magnetic circuit system; and wherein, the third outer flipped edge is fixed on the main body part of the skeleton; the third inner flipped edge is fixed on the positioning ring.

11. The multifunctional sounding device as described in claim 9, wherein, the vibration system further comprises a dome set on the main body part, and the dome is located inside the first inner flipped edge.

* * * * *